(12) United States Patent
Mate et al.

(10) Patent No.: US 11,080,936 B2
(45) Date of Patent: Aug. 3, 2021

(54) FIRST-PERSON PERSPECTIVE-MEDIATED REALITY

(71) Applicant: Nokia Technologies Oy, Espoo (FI)

(72) Inventors: Sujeet Shyamsundar Mate, Tampere (FI); Arto Lehtiniemi, Lempaala (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/702,820

(22) Filed: Dec. 4, 2019

(65) Prior Publication Data

US 2020/0193709 A1 Jun. 18, 2020

(30) Foreign Application Priority Data

Dec. 12, 2018 (EP) ..................................... 18211909

(51) Int. Cl.
*G06T 19/00* (2011.01)
*G06F 3/0481* (2013.01)
*H04N 13/376* (2018.01)
*H04N 13/332* (2018.01)

(52) U.S. Cl.
CPC ........ *G06T 19/006* (2013.01); *G06F 3/04815* (2013.01); *H04N 13/376* (2018.05); *H04N 13/332* (2018.05)

(58) Field of Classification Search
CPC .................................................... G06T 19/006
USPC ......................................................... 345/633
See application file for complete search history.

(56) References Cited

U.S. PATENT DOCUMENTS

| 2013/0249947 A1* | 9/2013 | Reitan ................... G06T 19/006 345/633 |
| 2013/0249948 A1* | 9/2013 | Reitan ................... G06T 19/006 345/633 |
| 2013/0293584 A1* | 11/2013 | Anderson ......... H04M 1/72547 345/633 |

(Continued)

FOREIGN PATENT DOCUMENTS

| EP | WO2017036516 A1 * | 3/2017 |
| EP | 3218896 A1 | 9/2017 |

(Continued)

OTHER PUBLICATIONS

Extended European Search Report received for corresponding European Patent Application No. 18211909.9, dated May 21, 2019, 9 pages.

*Primary Examiner* — Javid A Amini
(74) *Attorney, Agent, or Firm* — Harrington & Smith

(57) ABSTRACT

An apparatus comprising means for: enabling user-selection of a first sub-set of available mediated reality content based on a current point of view of a user; throughout a first period of time, causing rendering of the selected first sub-set of available mediated reality content to the user as it is selected; throughout the first period of time, storing a second sub-set of the available mediated reality content for potential future rendering, wherein the second sub-set is different to the first sub-set being rendered to the user and is not being rendered to the user during the first period of time; during at least a latter portion of the first period of time, determining whether or not to augment the user-selected first sub-set of available mediated reality content to include an alert concerning the second sub-set of available mediated reality content.

19 Claims, 11 Drawing Sheets

(56) References Cited

U.S. PATENT DOCUMENTS

| | | | | |
|---|---|---|---|---|
| 2014/0063061 A1* | 3/2014 | Reitan | G09G 3/003 | |
| | | | 345/633 | |
| 2014/0375683 A1* | 12/2014 | Salter | G02B 27/0172 | |
| | | | 345/633 | |
| 2015/0035861 A1* | 2/2015 | Salter | G06T 19/006 | |
| | | | 345/633 | |
| 2015/0235088 A1* | 8/2015 | Abovitz | A63F 13/213 | |
| | | | 345/633 | |
| 2015/0277119 A1* | 10/2015 | Wong | G02B 27/017 | |
| | | | 345/633 | |
| 2015/0348329 A1* | 12/2015 | Carre | G06F 16/9554 | |
| | | | 345/633 | |
| 2017/0178601 A1* | 6/2017 | Bloch | G06F 3/147 | |
| 2019/0147664 A1* | 5/2019 | Watanabe | A63F 13/25 | |
| | | | 345/633 | |

FOREIGN PATENT DOCUMENTS

| | | |
|---|---|---|
| EP | 3379379 A1 | 9/2018 |
| WO | 2017/036516 A1 | 3/2017 |

\* cited by examiner

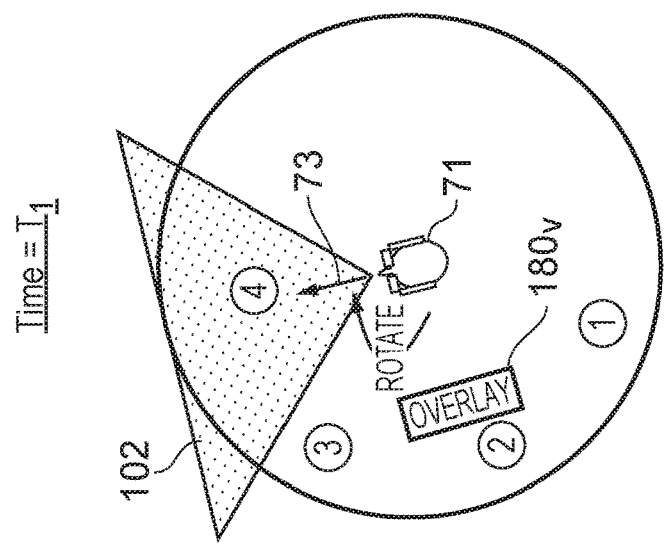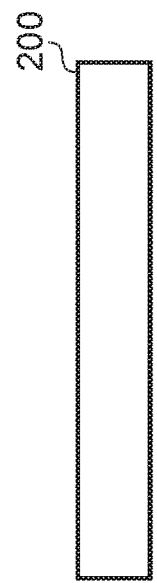
FIG. 8A
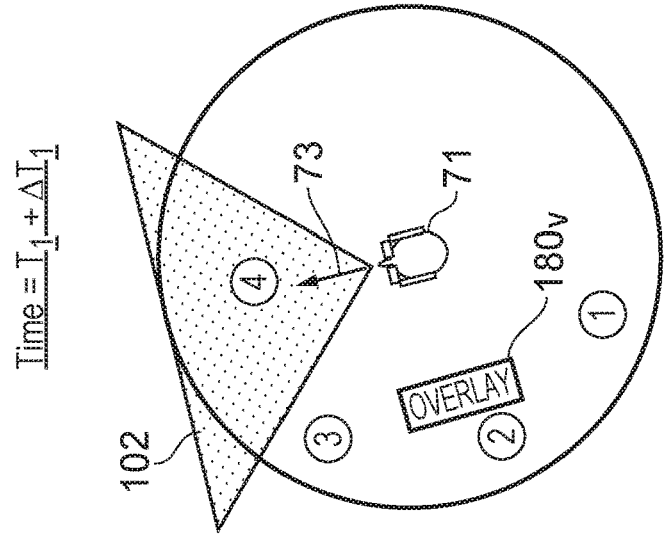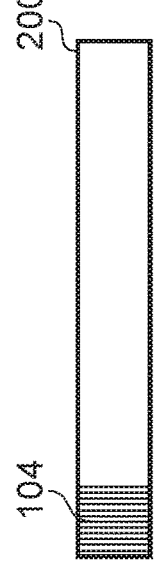
FIG. 8B
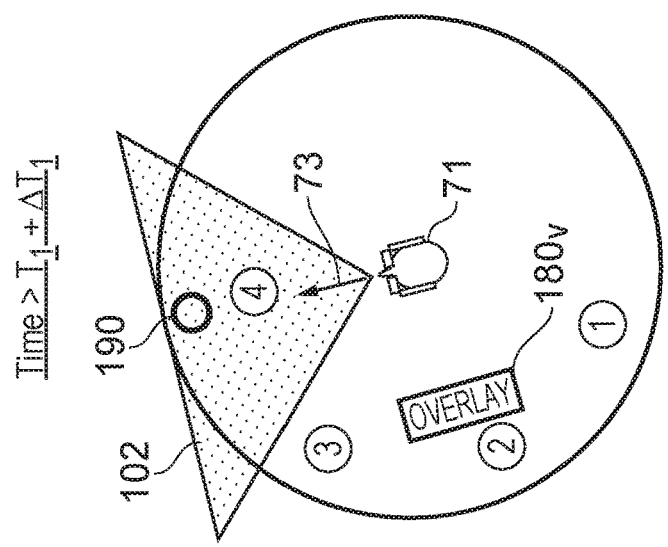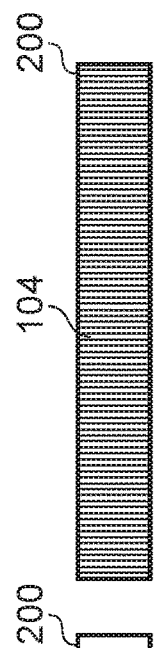
FIG. 8C

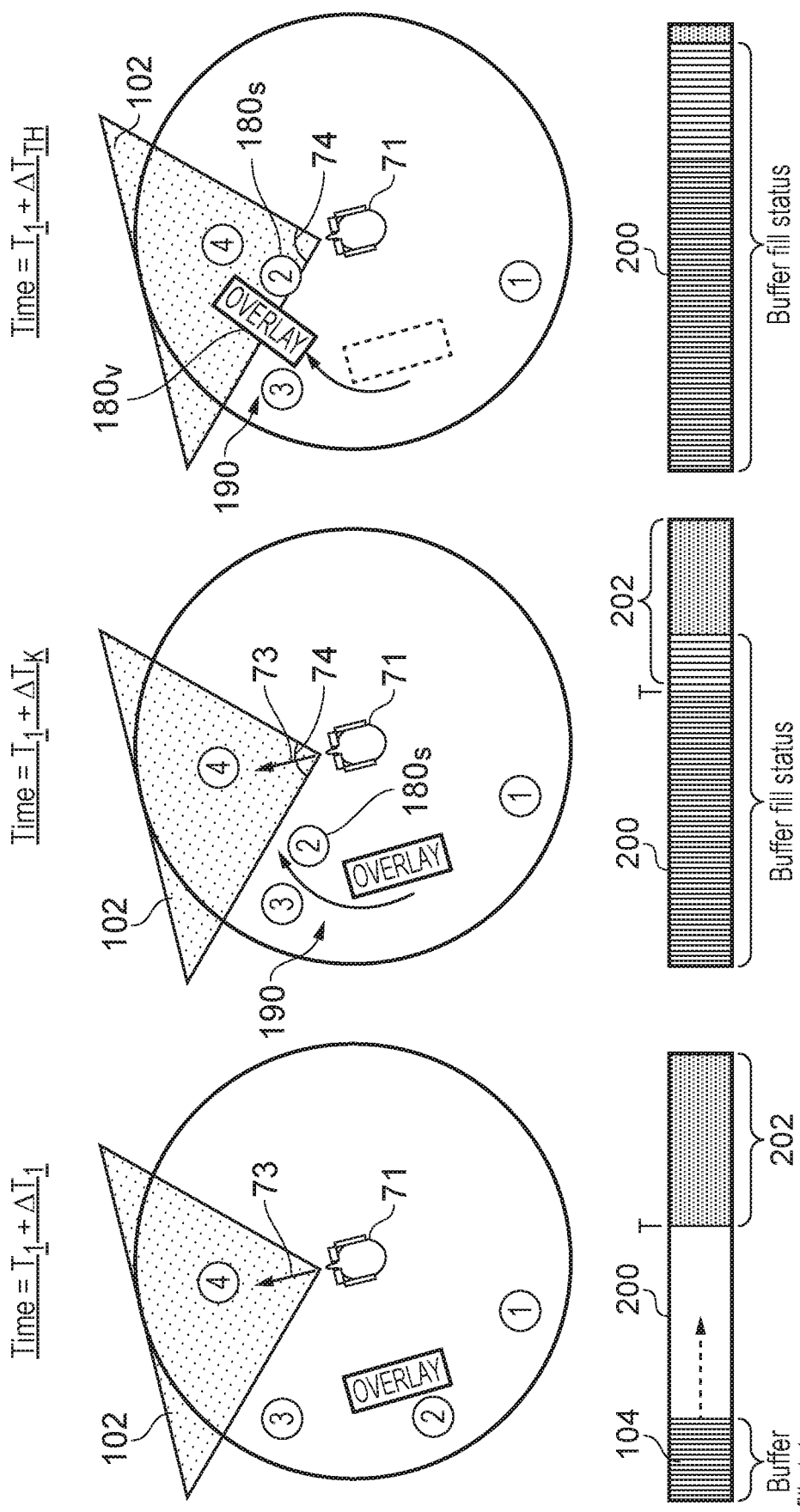

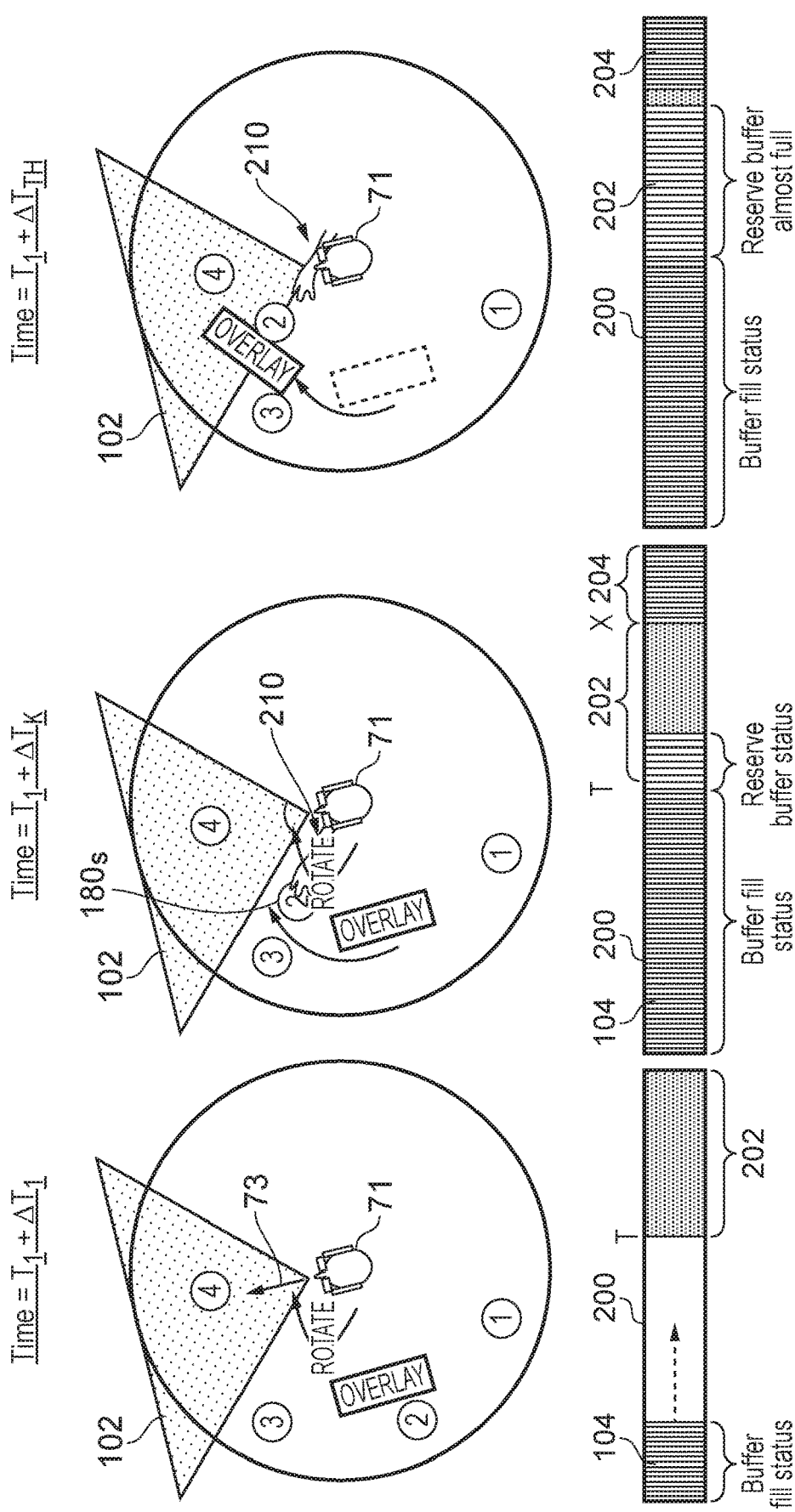

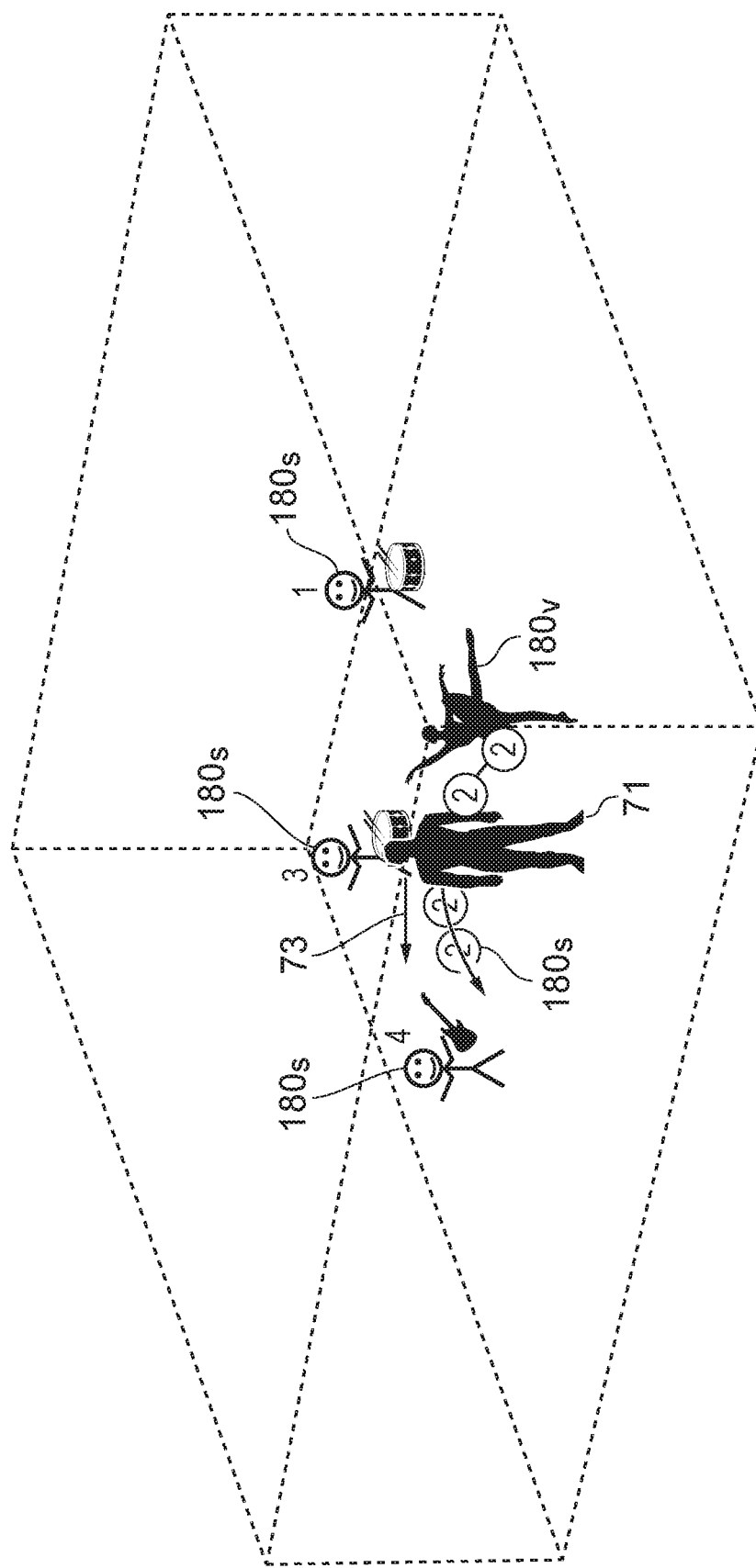

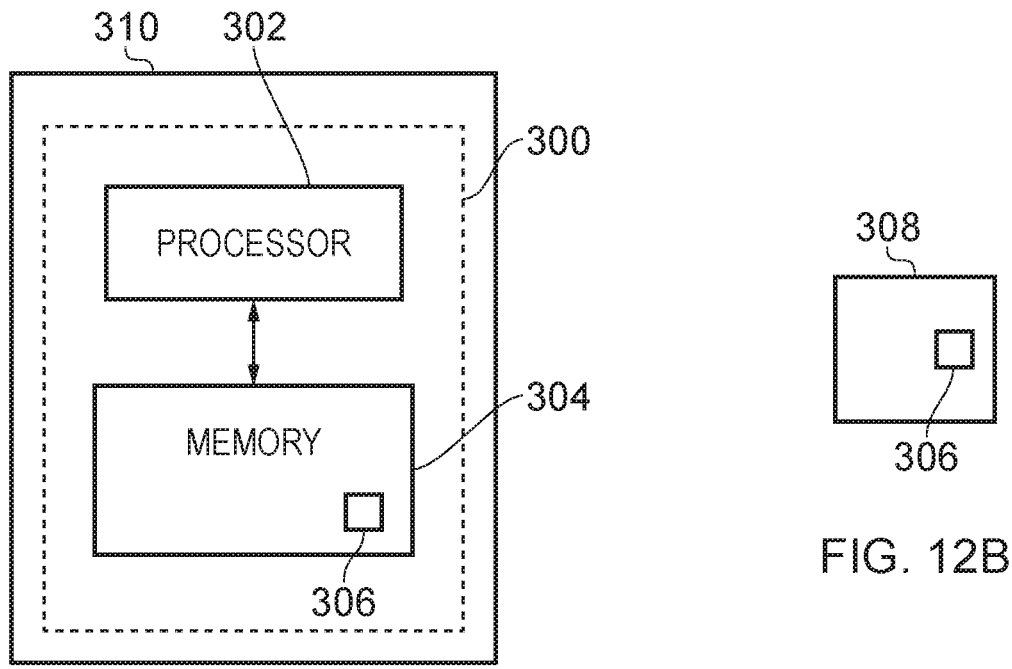
FIG. 12A
FIG. 12B
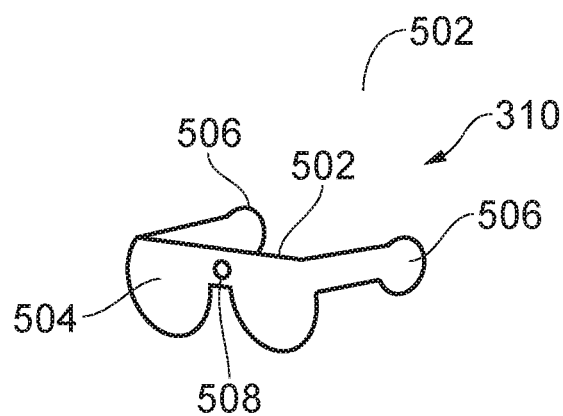
FIG. 13

FIRST-PERSON PERSPECTIVE-MEDIATED REALITY

TECHNOLOGICAL FIELD

Embodiments of the present disclosure relate to first-person perspective-mediated reality.

BACKGROUND

In first-person perspective-mediated reality a user's real point of view determines the point of view within a virtual space of a virtual user. The point of view of the virtual user determines what sub-set of the available mediated reality content is rendered to a user and consequently what representation of a virtual space is rendered to the user.

BRIEF SUMMARY

According to various, but not necessarily all, embodiments there is provided an apparatus comprising means for:

throughout a first period of time, enabling user-selection of a first sub-set of available mediated reality content based on a current point of view of a user, wherein the point of view of the user can change during the first period of time causing a change in the user-selected first sub-set;

throughout the first period of time, causing rendering of the selected first sub-set of available mediated reality content to the user as it is selected;

throughout the first period of time, storing a second sub-set of the available mediated reality content for potential future rendering, wherein the second sub-set is different to the first sub-set being rendered to the user and is not being rendered to the user during the first period of time;

during at least a latter portion of the first period of time, determining whether or not to augment the user-selected first sub-set of available mediated reality content to include an alert concerning the second sub-set of available mediated reality content.

In some but not necessarily all examples, the means for determining whether or not to augment the user-selected first sub-set of available mediated reality content to include an alert is further configured to determine whether or not to augment the user-selected first sub-set of available mediated reality content based upon an approaching change in memory management concerning the second sub-set of the set of available mediated reality content.

In some but not necessarily all examples, the means for determining whether or not to augment the user-selected first sub-set of available mediated reality content to include an alert is further configured to augment the user-selected first sub-set of available mediated reality content based upon available room for storing the second sub-set of available mediated reality content.

In some but not necessarily all examples, the means for determining whether or not to augment the user-selected first sub-set of available mediated reality content to include an alert is further configured to augment the user-selected first sub-set of available mediated reality content based upon one or more of the following:

an approaching automatic degrade of a resolution at which the second sub-set of available mediated reality content is stored;

an approaching automatic time-shifting of a beginning of the stored second sub-set of available mediated reality content; and an approaching automatic stop of recording of the second sub-set of available mediated reality content.

In some but not necessarily all examples, the alert enables a user-selectable option to control memory management concerning the second sub-set of available mediated reality content.

In some but not necessarily all examples, the means for determining whether or not to augment the user-selected first sub-set of available mediated reality content to include an alert is further configured to augment the user-selected first sub-set of available mediated reality content in dependence upon detection of an event associated with the second sub-set of available mediated reality content.

In some but not necessarily all examples, the means for determining whether or not to augment the user-selected first sub-set of available mediated reality content to include an alert is further configured to augment the user-selected first sub-set of available mediated reality content in dependence upon metadata for the second sub-set of available mediated reality content and/or in dependence upon analysis of the second sub-set of available mediated reality content.

In some but not necessarily all examples, the apparatus further comprises means for enabling a jump-transition from rendering a portion of the first sub-set of available mediated reality content to rendering a portion of the second sub-set of available mediated reality content, wherein the portion of the first sub-set of available mediated reality content is associated with a first virtual point of view and wherein the portion of the second sub-set of available mediated reality content is associated with a second virtual point of view, the first virtual point of view and the second virtual point of view being different.

In some but not necessarily all examples, fields of view associated with the first virtual point of view and the second virtual point of view are non-overlapping.

In some but not necessarily all examples, the portion of the first sub-set of available mediated reality content is associated with a first time within a timeline of the available mediated reality content and wherein the portion of the second sub-set of available mediated reality content is associated with a second time within the timeline of the available mediated reality content, the first time and the second time being different.

In some but not necessarily all examples, the alert enables a selectable option for causing the jump-transition.

In some but not necessarily all examples, the alert comprises movement of a virtual object within the first sub-set of available mediated reality content, wherein the virtual object is at least partially defined by content comprised within the second sub-set of the available mediated reality content.

In some but not necessarily all examples, the apparatus comprises means for selecting the second sub-set of the set of available mediated reality content in dependence upon user action and/or in dependence upon instructions associated with the available mediated reality content.

According to various, but not necessarily all, embodiments there is provided a method comprising:

throughout a first period of time, enabling user-selection of a first sub-set of available mediated reality content based on a current point of view of a user, wherein the point of view of the user can change during the first period of time causing a change in the user-selected first sub-set;

throughout the first period of time, causing rendering of the selected first sub-set of available mediated reality content to the user as it is selected;

throughout the first period of time, storing a second sub-set of the available mediated reality content for potential future rendering, wherein the second sub-set is different to the first sub-set being rendered to the user and is not being rendered to the user during the first period of time;

during at least a latter portion of the first period of time, determining whether or not to augment the user-selected first sub-set of available mediated reality content to include an alert concerning the second sub-set of available mediated reality content.

According to various, but not necessarily all, embodiments there is provided a computer program that when run on a processor enables the processor to cause:

throughout a first period of time, enabling user-selection of a first sub-set of available mediated reality content based on a current point of view of a user, wherein the point of view of the user can change during the first period of time causing a change in the user-selected first sub-set;

throughout the first period of time, causing rendering of the selected first sub-set of available mediated reality content to the user as it is selected;

throughout the first period of time, storing a second sub-set of the available mediated reality content for potential future rendering, wherein the second sub-set is different to the first sub-set being rendered to the user and is not being rendered to the user during the first period of time;

during at least a latter portion of the first period of time, determining whether or not to augment the user-selected first sub-set of available mediated reality content to include an alert concerning the second sub-set of available mediated reality content.

According to various, but not necessarily all, embodiments there is provided examples as claimed in the appended claims.

BRIEF DESCRIPTION

Some example embodiments will now be described with reference to the accompanying drawings in which:

FIGS. 8A, 8B, 8C show an example embodiment of the subject matter described herein;

FIGS. 9A, 9B, 9C, 9D, 9E show an example embodiment of the subject matter described herein;

FIGS. 10A, 10B, 10C show an example embodiment of the subject matter described herein;

FIGS. 11A, 11B, 11C show an example embodiment of the subject matter described herein;

FIGS. 12A, 12B show an example embodiment of the subject matter described herein;

Figure 3A:
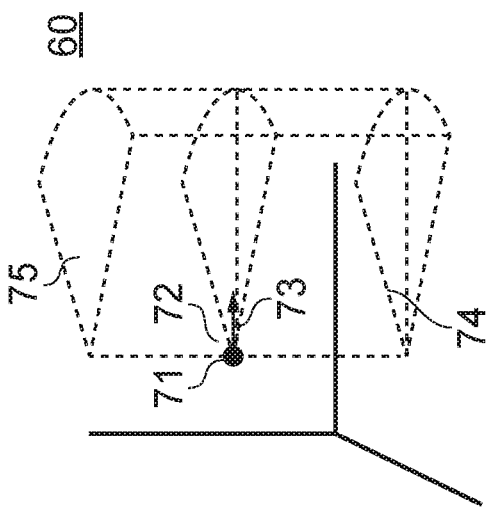
FIGS. 1A, 1B, 2A, 2B, 3A, 3B show an example embodiment of the subject matter described herein.

FIG. 13. shows an example embodiment of the subject matter described herein.

DEFINITIONS

"artificial environment" may be something that has been recorded or generated.

"virtual visual space" refers to a fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually, a fully or partially artificial environment (a virtual space) as a virtual scene at least partially rendered by an apparatus to a user. The virtual scene is determined by a point of view (virtual position)

within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first-person perspective-mediated" as applied to mediated reality, augmented reality or virtual reality means perspective-mediated with the additional constraint that the user's real point of view (location and/or orientation) determines the point of view (virtual position) within the virtual space of a virtual user;

"third person perspective-mediated" as applied to mediated reality, augmented reality or virtual reality means perspective-mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user.

"virtual user" defines the point of view (virtual position-location and/or orientation) in virtual space used to generate a perspective-mediated sound scene and/or visual scene. A virtual user may be a notional listener and/or a notional viewer.

"notional listener" defines the point of view (virtual position-location and/or orientation) in virtual space used to generate a perspective-mediated sound scene, irrespective of whether or not a user is actually listening.

"notional viewer" defines the point of view (virtual position-location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). In relation to first-person perspective-mediated reality, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). In relation to first-person perspective-mediated reality, both the user's orientation and the user's location in the real space determine the virtual position.

DETAILED DESCRIPTION

FIGS. 1A-B, 2A-2B, 3A-3B illustrate a method of rendering mediated reality using virtual content for the purposes of achieving mediated reality, for example, augmented reality or virtual reality. In these examples, the mediated reality is first-person perspective-mediated reality. It may or may not be user interactive. It may be 3DoF or 6DoF.

Figure 2A:
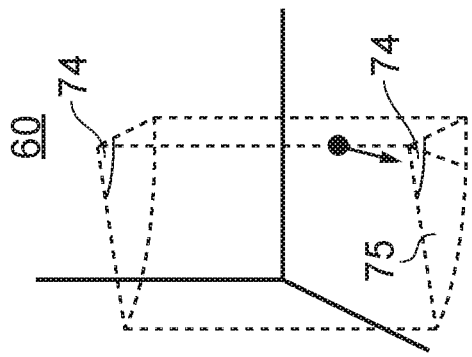
Figure 1A:
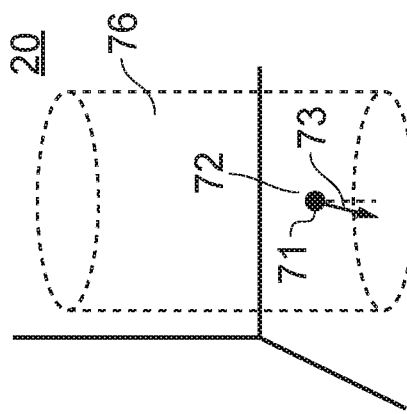

FIGS. 1A, 2A, 3A illustrate at a first time a real space 50, a sound space 20 and a visual space 60 respectively. There is correspondence between the sound space 20 and the virtual visual space 60. As illustrated in FIG. 1A, a user 51 in the real space 50 has a position (point of view) defined by a location 52 and an orientation 53. The location is a three-dimensional location and the orientation is a three-dimensional orientation. As illustrated in FIGS. 2A, 3A a virtual user 71 in the virtual space (sound space 20 and/or virtual visual space 60) has a virtual position (virtual point of view) defined by a virtual location 72 and a virtual orientation 73. The virtual location 72 is a three-dimensional location and the virtual orientation 73 is a three-dimensional orientation.

In 3DoF first-person perspective-mediated reality, an orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user 51. A virtual sound scene 76 is that part of the virtual sound space 20 that is rendered to a user 51. The virtual sound space 20 and the virtual visual space 60 correspond in that a position within the virtual sound space 20 has an equivalent position within the virtual visual space 60. In 3DoF mediated reality, a change in the location 52 of the user 51 does not change the virtual location 72 or virtual orientation 73 of the virtual user 71.

In the example of 6DoF first-person perspective-mediated reality, the situation is as described for 3DoF and in addition it is possible to change the rendered virtual sound scene 76 and the displayed virtual visual scene 75 by movement of a location 52 of the user 51. For example, there may be a mapping M between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered virtual sound scene 76 and also changes the rendered virtual visual scene 75.

Figure 3B:
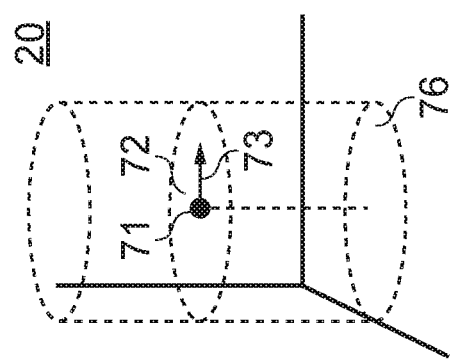
Figure 2B:
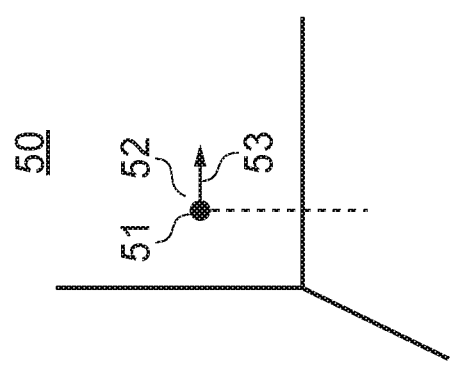
Figure 1B:
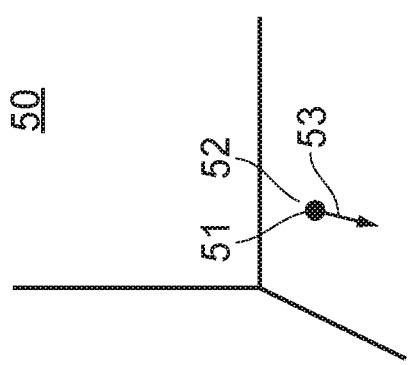

This may be appreciated from FIGS. 1B, 2B and 3B which illustrate the consequences of a change in location 52 and orientation 53 of the user 51 on respectively the rendered virtual sound scene 76 (FIG. 2B) and the rendered virtual visual scene 75 (FIG. 3B).

Although the location 52 and orientation 53 are three-dimensional in the illustrated example, in some examples one or both may be two-dimensional.

Although the location 52 and orientation 53 determine the point of view (the position) in the illustrated example, in some examples only the orientation determines the point of view.

Figure 4:
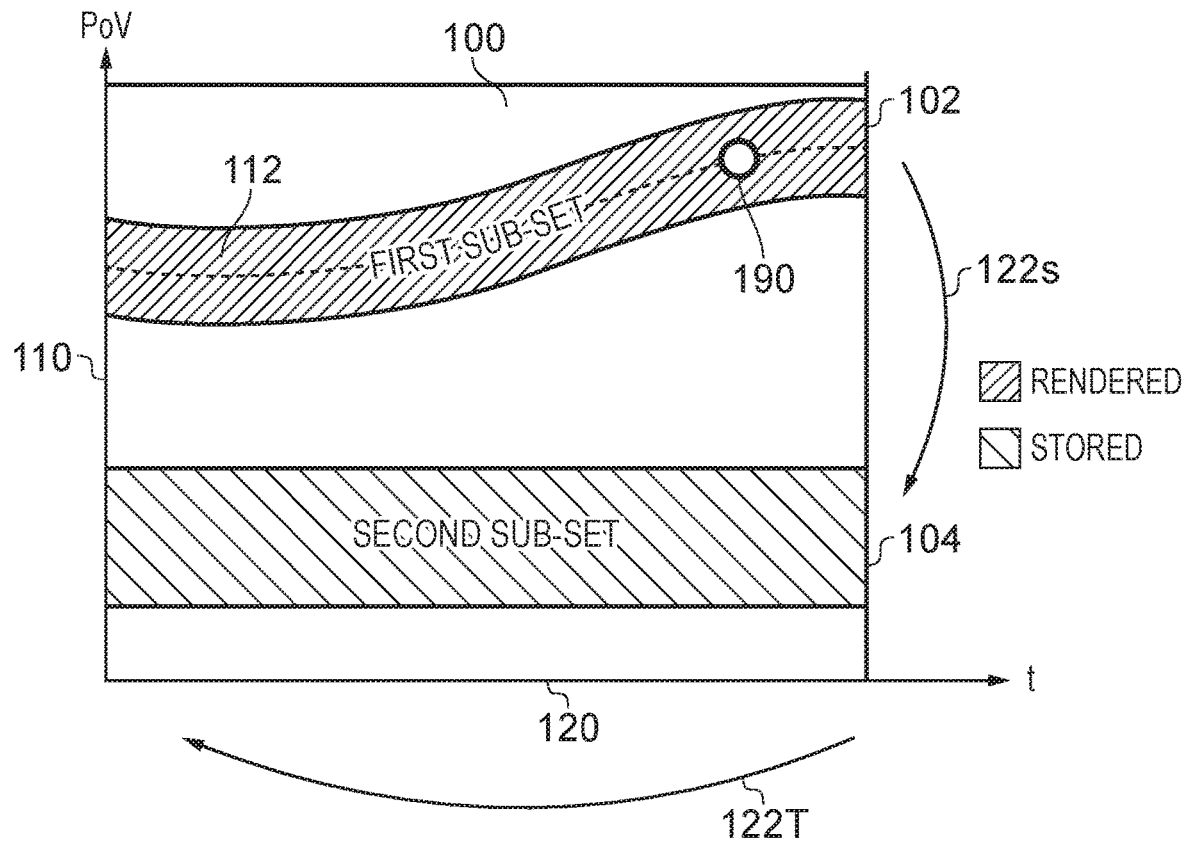
FIG. 4 shows an example embodiment of the subject matter described herein.

FIG. 4 illustrates an example of available mediated reality content 100. The available mediated reality content 100 has a timeline 120 that defines the progression of a time t. The available mediated reality content 100 evolves and changes over the time t. The available mediated reality content 100 at a time t, MRC(t), represents a large number of potential visual and/or audio scenes that can be selected by a particular point of view (PoV) 110.

In accordance with first-perspective mediated reality, as previously described, as the point of view of the user 51 changes, the virtual point of view of the virtual user 71 changes which in turn changes a first sub-set 102 of the available mediated reality content 100. The user 51 has a particular point of view, a current real point of view, at any particular time t. The current point of view of the user defines a current corresponding virtual point of view of the virtual user 71, which selects the first sub-set 102 of available mediated reality content 100, $MRC_1(t)$.

The point of view 112 of the user 51 (and virtual user 71) can change during the timeline 120, for example as illustrated in FIG. 4. The current point of view 112 of the user 5, $PoV_u(t)$, selects a first sub-set 102 of available mediated reality content 100, $MRC_1(t)$.

The first sub-set 102 of the available mediated reality content 100 is rendered in real time such that the rendered virtual scene changes immediately with the change in the point of view 112 of the user 51.

It will be understood from FIG. 4, that there is a significant amount of available mediated reality content 100 that is not included within the first sub-set 102 of available mediated reality content 100 rendered to the user. In some examples, for example where the available mediated reality content 100 is streamed content or live content, it will not necessarily be available for future rendering.

A portion of the un-rendered available mediated reality content 100, the second sub-set 104, is stored for future potential rendering. The second sub-set 104 is different to the first sub-set 102 being rendered to the user 51 and is not rendered to the user 51 while the first sub-set 102 is rendered. Instead, while the first sub-set 102 is being rendered, the second sub-set 104 is stored so that it might, in the future, be rendered, for example, instead of or in addition to the first sub-set 102.

It can also be seen from FIG. 4 that the first sub-set 102 of the available mediated reality content 100 is augmented to include an alert 190 concerning the second sub-set 104 of available mediated reality content 100.

In some, but not necessarily all, examples, this alert 190 may prompt the user to cause a jump-transition 122 from rendering the first sub-set 102 of the available mediated reality content 100 to rendering the second sub-set 104 of the available mediated reality content 100 either corresponding to the current time or to an earlier time.

A jump-transition is a transition from rendering a portion of the first sub-set 102 of available mediated reality content 100 (e.g. $MRC_1$) to rendering a portion of the second sub-set 104 of available mediated reality content 100 (e.g. $MRC_2$). The portion of the first sub-set 102 of available mediated reality content 100 is associated with a first virtual point of view of the available mediated reality content 100 and the portion of the second sub-set 104 of available mediated reality content 100 is associated with a second virtual point of view, that is different from the first virtual point of view. The jump-transition therefore causes a shift in the virtual point of view. Where the mediated reality content 100 comprises visible mediated reality content, a field of view associated with the first virtual point of view and the field of view associated with the second virtual point of view are non-overlapping.

A jump-transition may also cause a shift in the timeline 120. Thus the portion of the first sub-set 102 of available mediated reality content 100 is associated with a first time within a timeline 120 of the available mediated reality content 100 and the portion of the second sub-set 104 of the available mediated reality content 100 is associated with a second time within the timeline 120 of the available mediated reality content 100. The second time is different to and precedes the first time. The time-shift is normally of a significant amount of time, for example, greater than 10 seconds.

Thus, the jump-transition 122 can involve a spatial jump $122_S$ corresponding to a sudden change in point of view 110 of the virtual user 71 and also a temporal jump $122_T$ corresponding to a sudden jump in time. It may, for example, be possible for there to be a jump-transition 122 from rendering the first sub-set 102 of the available mediated reality content 100, currently at a first time, to the rendering of the stored second sub-set 104 of available mediated reality content 100, at an earlier second time.

In a jump-transition, the correspondence between the point of view of the user and the point of view of the virtual user, is re-set so that there is correspondence between the point of view of the user and a new point of view of the virtual user. With the jump-transition, the content seen by the user is a new point of view without the use moving his/her head. The new virtual point of view is offset by a fixed amount from the original virtual point of view. The new virtual point of view is the point of view required to render the second sub-set 104 of the available mediated reality content 100. In some but not necessarily all examples, when the second sub-set 104 of the available mediated reality content 100 is rendered, first-person perspective mediated reality may be enabled for the second sub-set 104 of the available mediated reality content 100.

In the above described jump-transitions, the stored second sub-set 104 is rendered instead of the first sub-set 102. In other examples, the stored second sub-set 104 is rendered in addition to the first sub-set 102.

For example, following a jump-transition, a portion of first sub-set 102 associated with a first virtual point of view is rendered simultaneously with a portion of the second sub-set 104 associated with a second virtual point of view. Any changes in the user's point of view causes corresponding changes to the second virtual point of view and, optionally, the first virtual point of view. For example, the second sub-set 104 can be rendered in an overlay in a window or on an object. In a situation when the overlay is visible, the background content (the first sub-set 102) may also be visible.

In at least some examples, during rendering of the second sub-set 104 of the available mediated reality content 100, some live content that is a continuation in time of the first sub-set will need to be stored, so that it can be viewed after viewing the second sub-set 104 of the available mediated reality content 100. In some examples, a jump-transition in time can be used to catch-up with the live content.

An example of a use case is: a user, in a current viewing position, is watching content (first sub-set 102), and cannot see an overlay outside of the current field of view (second sub-set 104). Due to the overlay buffer overflow or some other highlight likely to be missed, a transition indication is shown. Subsequently the user starts to view the overlay (second sub-set 104). Following this the user may again choose to switch back to viewing the first sub-set 102. The second sub-set 104 is rendered from stored content. The storage of content initiates whenever that content is outside of the user field of view and may continue until the memory buffer is full. Subsequently, when the user moves back to viewing the first sub-set 102, the content switches back to the current timeline. The catch up, from the second subset timeline to the first subset timeline, comprises the missed first subset content.

Figure 5:
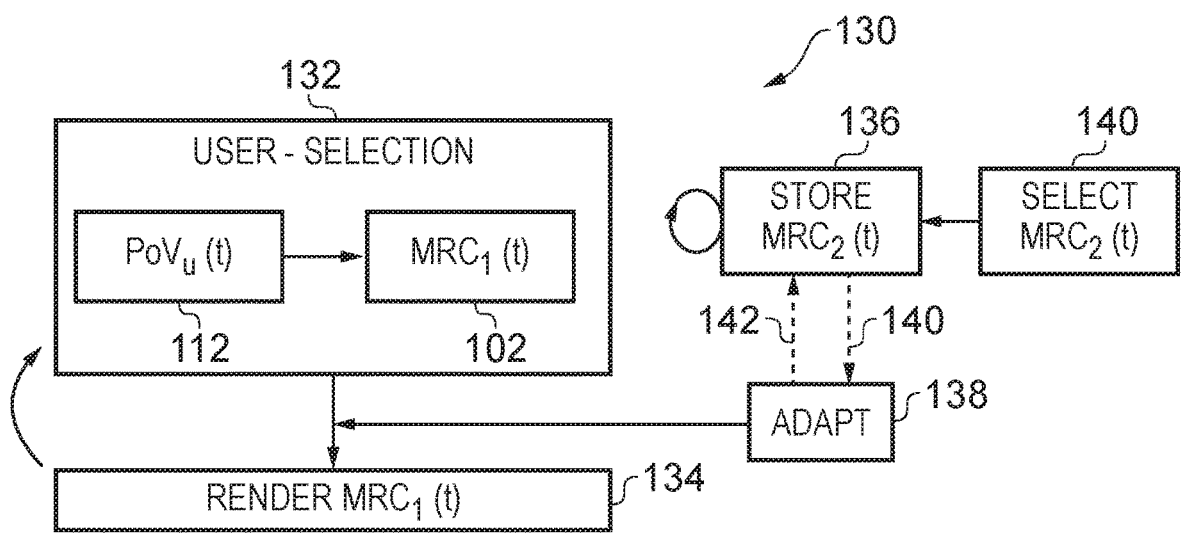
FIG. 5 shows an example embodiment of the subject matter described herein.

FIG. 5 illustrates an example method 100 corresponding to the situation described with respect to FIG. 4. The method 130 performs blocks 132, 134, 136 throughout a first period of time.

At block 132, the method 130 enables user-selection of the first sub-set 102 of the available mediated reality content 100 ($MRC_1$) based on a current point of view 112 of a user 51 ($PoV_u$). The point of view 112 of the user 51 ($PoV_u(t)$) can change during the first period of time causing a change in the user-selected first sub-set 102 ($MRC_1(t)$), as illustrated in FIG. 4.

At block 134, the method 130 causes rendering of the selected first sub-set 102 of the available mediated reality content 100 ($MRC_1(t)$), to the user 51, in real time t, as it is selected at block 132.

At block 136, the method 130 causes storing of a second sub-set 104 of the available mediated reality content 100 ($MRC_2(t)$), for potential future rendering. The second sub-set 104 is different to the first sub-set 102 being rendered 134 to the user 51 and is not being rendered to the user during the first period of time.

The method 130 also comprises, at block 138, determining whether or not to augment the user-selected first sub-set 102 of available mediated reality content 100 to include an alert 190 concerning the second sub-set 104 of available mediated reality content 100. This determination may, for example, occur throughout the first period of time or it may only occur at a latter portion of the first period of time. In any event, it occurs during at least a latter portion of the first period of time.

Various different triggers may be used to cause block 138 to include an alert 190 in the first sub-set 102 of the available mediated reality content 100.

In some, but not necessarily all, examples, the trigger is activated based on an availability status of the second sub-set 104 of the available mediated reality content 100. The availability status may, for example, indicate that information content of the second sub-set 104 is about to be lost or is being lost such that it will not be available for rendering. In other examples, the availability status of the second sub-set 104 may be determined by an event that is occurring in the second sub-set 104 of the available mediated reality content 100 at that current time.

In some, but not necessarily all, examples, the trigger for the production of the alert 190 is caused by an approaching change in management of the availability of the second sub-set 104 for rendering. This may, for example, occur because there is an approaching change in memory management concerning the second sub-set 104 of the available mediated reality content 100. A change in memory management may for example occur because there will soon be insufficient memory to continue storing the second sub-set 104 of the available mediated reality content 100.

For example, the trigger 140 for the production of the alert 190 may be based upon the amount of room (space) remaining for storing the second sub-set 104 of the available mediated reality content 100 in a memory. A threshold value used for determining the production of the alert 190, when it is exceeded, may be variable.

In some, but not necessarily all, examples, the alert 190 is produced when one or more of the following memory management processes occurs or will soon occur:

(i) automatically degrading the resolution at which the second sub-set 104 of the available mediated reality content 100 is stored in the memory so that the second sub-set 104 of available mediated reality content 100 can continue to be stored for a longer period of time albeit at a lower resolution. The lower resolution may be a lower spatial resolution (for example less pixels) and/or at a lower temporal resolution (e.g. a lower frame rate).

(ii) automatically switching the start time for the second sub-set 104 the second sub-set 104 from a fixed start time to a moving start time. Continually shifting the start time of the second sub-set 104, releases memory that can be used for storing the current second sub-set 104 of the available mediated reality content 100.

(iii) Automatically stopping the storage of the second sub-set 104 of the available mediated reality content 100.

Which one or more of the above-mentioned memory management processes occurs may, in some examples, be determined by the available mediated reality content 100, for example, based on analysis of its content or based on metadata associated with it. In other examples, it may be determined by user selection or user settings.

It will be appreciated therefore that, in at least some examples, if the user ignores the alert 190 then there will be a potentially detrimental impact on the storage of the second sub-set 104 of the available mediated reality content 100 in that sections of the content may be lost from the beginning or from its end or may be stored with lower resolution.

The user may be presented with different options for responding to the alert 190.

For example, in some embodiments the user may be presented with an option to perform a jump-transition to the second sub-set 104 of the available mediated reality content 100.

For example, in some embodiments, the user may be presented with a selectable memory extension option to allocate 142 additional memory storage for storing the second sub-set 104 of the available mediated reality content 100. Alternatively, memory extension may occur automatically unless the user chooses to prevent it by selecting an option.

While in the above-described examples the trigger for the alert 190 is based upon an approaching change in management of the availability of the second sub-set 104 of the available mediated reality content 100, in other examples it may be based upon the current second sub-set 104 of the available mediated reality content 100 and the occurrence of a particular event associated with the second sub-set 104 of the available mediated reality content 100 at that time.

For example, the alert 190 may, in some but not necessarily all examples, be triggered when an event of a particular nature occurs in association with the second sub-set 104 of the available mediated reality content 100. The event may be detected based on content analysis of the second sub-set 104 of the available mediated reality content 100 or based on analyzing metadata that annotates the second sub-set 104 of the available mediated reality content 100. In these examples, the alert 190 may, for example, be used to alert the user to a particular event that is occurring live within the second sub-set 104 of the available mediated reality content 100.

In some, but not necessarily all, examples, the user 51 may be provided with options to program what event or events trigger an alert 190 or alerts 190.

Figure 6:
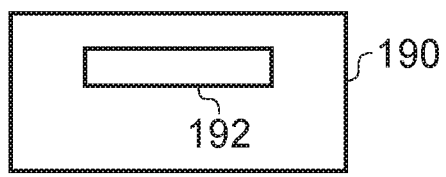
FIG. 6 shows an example embodiment of the subject matter described herein.

FIG. 6 illustrates a schematic example of one example of an alert 190. The alert 190 comprises a virtual object that is rendered as part of the first sub-set 102 of the available mediated reality content 100. There is also provided, as part of the first sub-set 102 of the available mediated reality content 100 or otherwise, one or more user-selectable options 192 for user input. As previously described, these user input options may be used to control memory management and/or to cause a jump-transition from rendering the first sub-set 102 to rendering the stored second sub-set 104 of available mediated reality content 100.

The alert 190 may take any suitable form. In some examples it is a virtual object, for example a sound object and/or a visual virtual object. In some examples, the alerting virtual object may move within the rendered visual scene corresponding to the first sub-set 102 of the available mediated reality content 100. The alerting virtual object may be a visual virtual object and/or a sound object. In at least some examples, the alerting virtual object is at least partially defined by content comprised within the second sub-set 104 of the available mediated reality content. The alerting virtual object may, for example, be a virtual object defined by the second sub-set 104 of the available mediated reality content.

Referring back to FIG. 5, the method 130, in this example, also comprises at block 140 a process for selecting the second sub-set 104 of the available mediated reality content 100.

The block 140 selects the second sub-set 104 of the available mediated reality content 100 for potential future rendering. This second sub-set 104 is different to the first sub-set 102 being rendered as a consequence of user selection via the user's point of view 112.

The selection of the second sub-set 104 of the available mediated reality content 100 for storage can be based, in some but not necessarily all examples, on user action and/or on information associated with the available mediated reality content 100.

The selection of the second sub-set 104 by user action may be as a consequence of explicit user action or as a consequence of implicit user action. An example of explicit user action would be when the method 130 presents one or more options to the user for the selection of a particular second sub-set 104 of the available mediated reality content 100 and the user selects a particular option. Examples of implicit selection may for example include actions performed by the user in relation to the available mediated reality content 100 as it is being rendered. For example, the second sub-set 104 may relate to content that the user has been watching for a period of time exceeding a threshold period or that the user has previously watched for period of time exceeding a threshold period or that corresponds to content that is similar to that which the user has previously watched for a period exceeding a threshold period or is similar to content that the user has specified, implicitly or explicitly, as being of interest. Other examples may be where the user interacts with particular virtual objects by for example switching on a virtual media output device within the virtual space such as a virtual television or a virtual radio. In this case, the second sub-set 104 of the available mediated reality content 100 includes the output of that media device.

In these examples or in other examples, the selection of the second sub-set 104 of the available mediated reality content 100 may depend upon information associated with the available mediated reality content 100. For example, the available mediated reality content 100 may be associated with metadata that has been annotated by a creator of the available mediated reality content 100 that identifies content that is of significant importance that should not be missed. This content may be preferentially selected as the second sub-set 104 of the available mediated reality content 100.

Although in this section and in previous sections reference is made to a single second sub-set 104 of available mediated reality content 100 that is associated with a single or a contiguous range of points of view 110 of the user, in other examples there may be multiple distinct second sub-sets 104 of available mediated reality content 100 that are simultaneously stored.

Figure 7A:
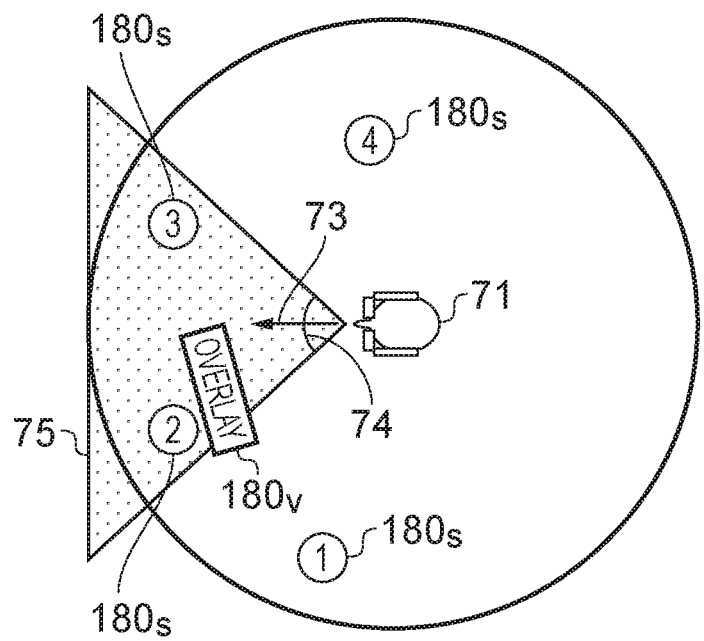
FIGS. 7A and 7B show an example embodiment of the subject matter described herein.

FIG. 7A illustrates an example of a virtual space 20, 60. The mediated reality content rendered to a user 51 (not illustrated) is controlled by first-perspective mediated reality. The point of view of the user 51 (not illustrated) controls a corresponding virtual orientation 73 of a virtual user 71 and the point of view 73 of the virtual user 71 determines the mediated reality content, for example the virtual visual scene 75, rendered to the user 51 (not illustrated).

In this example the virtual space comprises a number of virtual objects 180. These include one or more sound objects $180_s$ and one or more virtual visual objects $180_v$. The virtual objects 180 have fixed positions, in this example, within the virtual space and consequently their positions change relative to the virtual user 71 when the virtual orientation 73 of the virtual user 71 changes, that is, they are "world locked". In the example illustrated, the virtual user 71 has 3DoF, however the examples described also relate to 6DoF.

Figure 7B:
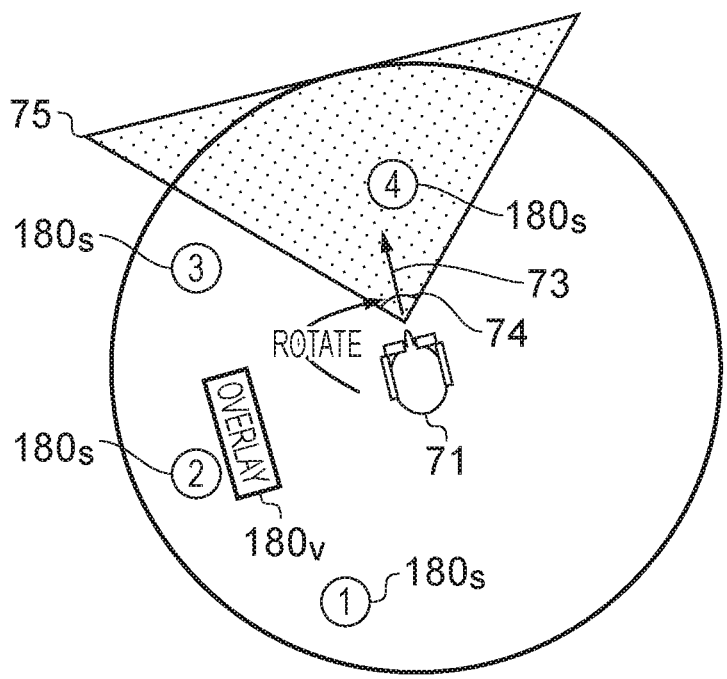

When the user 51 (not illustrated) turns to the right there is a corresponding rotation of the point of view 73 of the virtual user 71 as illustrated in FIG. 7B. As a consequence, the virtual visual object $180_v$ no longer lies within the field of view 74 of the virtual user 71. In this example, the content that defines the virtual visual object $180_v$ is the second sub-set 104 of available mediated reality content 100 that will be stored for optional future rendering.

FIGS. 8A to 8D illustrate an example in which the second sub-set 104 of the available mediated reality content 100 is stored in a memory buffer 200. The memory buffer 200 may be any suitable type of memory.

As illustrated in FIG. 8A, the storage of the second sub-set 104 of the available mediated reality content 100 starts at time $t=T_1$ when the virtual user 71 turns away from the virtual visual object $180_v$. While the user 51 (virtual user 71) is turned away from the virtual visual object $180_v$, then the first sub-set 102 of the available mediated reality content 100 that is determined by the point of view 53 of the user 51

(point of view 73 of the virtual user 71) is rendered to the user 51. This occurs throughout each of FIGS. 8A, 8B, and 8C. Meanwhile while the first sub-set 102 of the available mediated reality content 100 is being rendered to the user 51, the second sub-set 104 of the available mediated reality content is being stored in the memory buffer 200 as illustrated in FIG. 8B. As illustrated in FIG. 8C, when the memory buffer 200 begins to become filled or is filled, then an alert 190 is generated within the first sub-set 102 of the available mediated reality content 100.

Figure 9B:
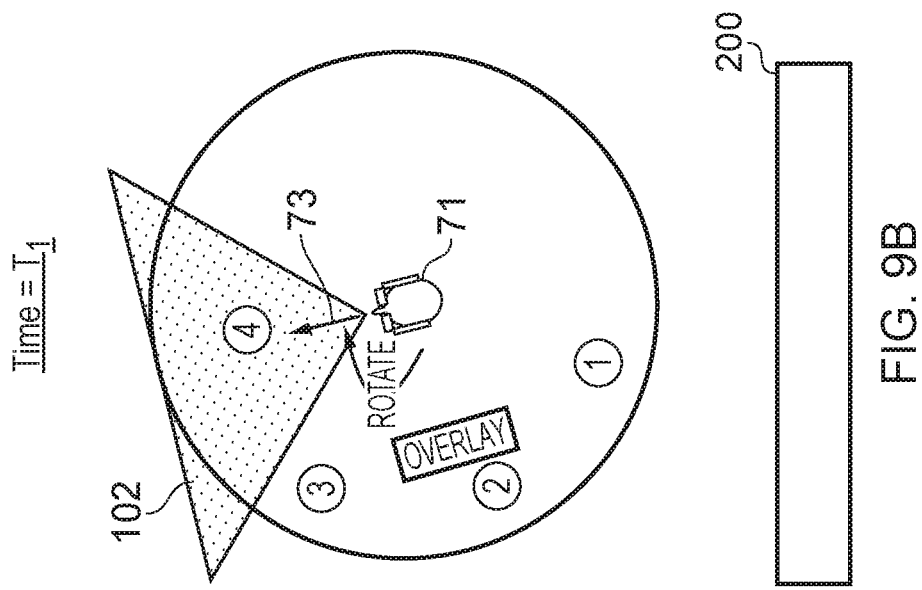

FIGS. 9A to 9E illustrate examples, which are similar to those illustrated in FIGS. 8A to 8C. However, in these examples there is a reserve buffer 202 of the memory buffer 200 that starts at a threshold T. The memory buffer 200 may be any suitable type of memory. The alert 190 is generated when the reserve buffer 202 is in use but before it is full as illustrated in FIGS. 9D and 9E.

Figure 9A:
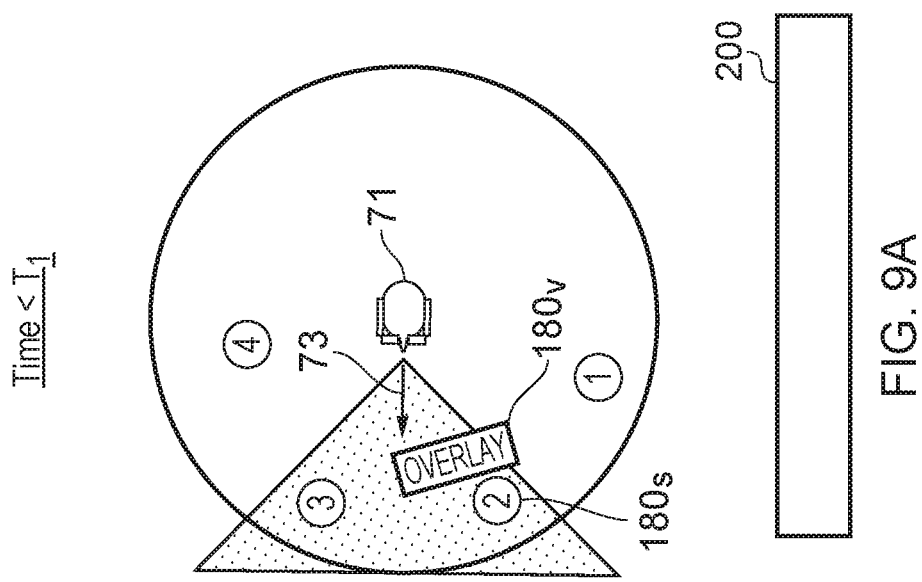

In FIG. 9A, the virtual user 71 is looking towards the virtual visual object $180_v$. The available mediated reality content 100 associated with the virtual visual object $180_v$ is rendered to the user 51 because the virtual visual object $180_v$ lies within the field of view of the virtual user 71. At this time no second sub-set 104 of the available mediated reality content 100 is being stored.

At the time corresponding to FIG. 9B ($t=T_1$), the user 51/virtual user 71 has rotated their point of view to the right. The virtual visual object $180_v$ no longer lies within the field of view of the virtual user 71. Only the mediated reality content associated with the current point of view of the virtual user 71 is rendered to the user 51. Consequently, a first sub-set 102 of the available mediated reality content 100 is rendered to the user 51 that does not include any content associated with the virtual visual object $180_v$. However, the mediated reality content associated with the virtual visual object $180_v$ is starting to be stored in the memory buffer 200 as a second sub-set 104 of available mediated reality content 100.

As illustrated in FIG. 9C, while the virtual user 71 does not look towards the virtual visual object $180_v$, the first sub-set 102 of the available mediated reality content 100 (that does not include the virtual visual object $180_v$) continues to be rendered to the user and the second sub-set 104 of the available mediated reality content 100 associated with the virtual visual object $180_v$ continues to be stored in the memory buffer 200.

As illustrated in FIG. 9D, the virtual user 71 continues to look away from the virtual visual object $180_v$. Consequently the first sub-set 102 of the available mediated reality content 100 that continues to be rendered to the user 51 does not include the content of the virtual visual object $180_v$. However, the content of the virtual visual object $180_v$ continues to be stored as the second sub-set 104 of the available mediated reality content in the memory buffer 200. At this time, the amount of the second sub-set 104 of the available mediated reality content 100 that has been stored in the memory buffer 200 has exceeded a threshold T and an alert 190 has started to be generated in the first sub-set 102 of the available mediated reality content 100. At this time, the alert 190 is only an audio alert. The sound object(s) $180_s$ associated with the virtual visual object $180_v$ are made more prominent to the user 51 by for example moving them towards the field of view 74 of the virtual user 71.

As illustrated in FIG. 9E, the virtual user 71 continues to look away from the virtual visual object $180_v$. Consequently the first sub-set 102 of the available mediated reality content 100 continues to be rendered to the user 51. The content of the virtual visual object $180_v$ continues to be stored as the second sub-set 104 of the available mediated reality content in the memory buffer 200. At this time, the amount of the second sub-set 104 of the available mediated reality content 100 that has been stored in the memory buffer 200 has further exceeded the threshold T and the alert 190 generated in the first sub-set 102 of the available mediated reality content 100 has changed. At this time, the alert 190 is both an audio alert and a visual alert. The sound object(s) $180_s$ associated with the virtual visual object $180_v$ are made even more prominent to the user 51 by for example moving them into the field of view 74 of the virtual user 71. The virtual visual object $180_v$ is also moved into the field of view 74 of the virtual user 71.

In some examples, the user 51 may be able to control the value of the threshold T.

In some examples, the user 51 may be able to control a value of a first threshold at which movement of the sound object(s) $180_s$ towards the virtual user starts and control a value of a second threshold at which the virtual visual object $180_v$ appears to the user.

In some examples, the user 51 may be able to control the size of the memory buffer 200 and/or the size of the reserve buffer 202.

In the examples illustrated, the virtual objects associated with the alert 190, including the sound objects associated with the virtual visual objects $180_v$ and the virtual visual object $180_v$, move with a speed that depends on the amount of the reserve buffer 202 that remains to be filled. The speed is selected so that the virtual objects arrive, as distractions to the user 51 before the reserve buffer has been completely filled by the second sub-set 104 of the available mediated reality content 100.

FIGS. 10A to 10C illustrates an example, which correspond to FIGS. 9C, 9D and 9E. The description of FIG. 9C is also appropriate for FIG. 10A. In this example the user 51/virtual user 71 is able to interact with the alert 190, as illustrated in FIGS. 10B and 10C, to switch it off or to make it less intrusive.

In the example of FIG. 10B, as the sound object(s) $180_s$ associated with the virtual visual object $180_v$ approaches the virtual user 71 as the alert 190, as previously described with reference to FIG. 9D. In this example, the virtual user 71 is able to perform an action 210 that pushes back those sound object(s). In this example, the user 51 performs a push gesture with her hand or arm. In this example this action 210 additionally causes an increase in the size of the reserve buffer 202. The reserve buffer 202 is augmented by additional buffer 204. This ability for the user/virtual user to interact via the action 210 with the alert 190 and extend the memory buffer 200 and reserve buffer 202 using an additional buffer 204 may alternatively or additionally occur in relation to the movement of the virtual visual object $180_v$ as illustrated in FIG. 10C.

When the user interacts with the alert 190 then the alert becomes less prominent by for example moving further away, becoming less loud, becoming less visible etc.

In some examples the alert generation process may be repeated replacing the threshold T associated with the reserve buffer 202 with a threshold X associated with the additional buffer 204. The user is again alerted by an alert 190 similar to that previously described, when the new threshold X is exceeded and the capacity of the additional buffer 204 is about to be used up. This process may be as described with reference to FIG. 9C-9E or 10A-10C but replacing the threshold T with the new threshold X.

Figure 11A:
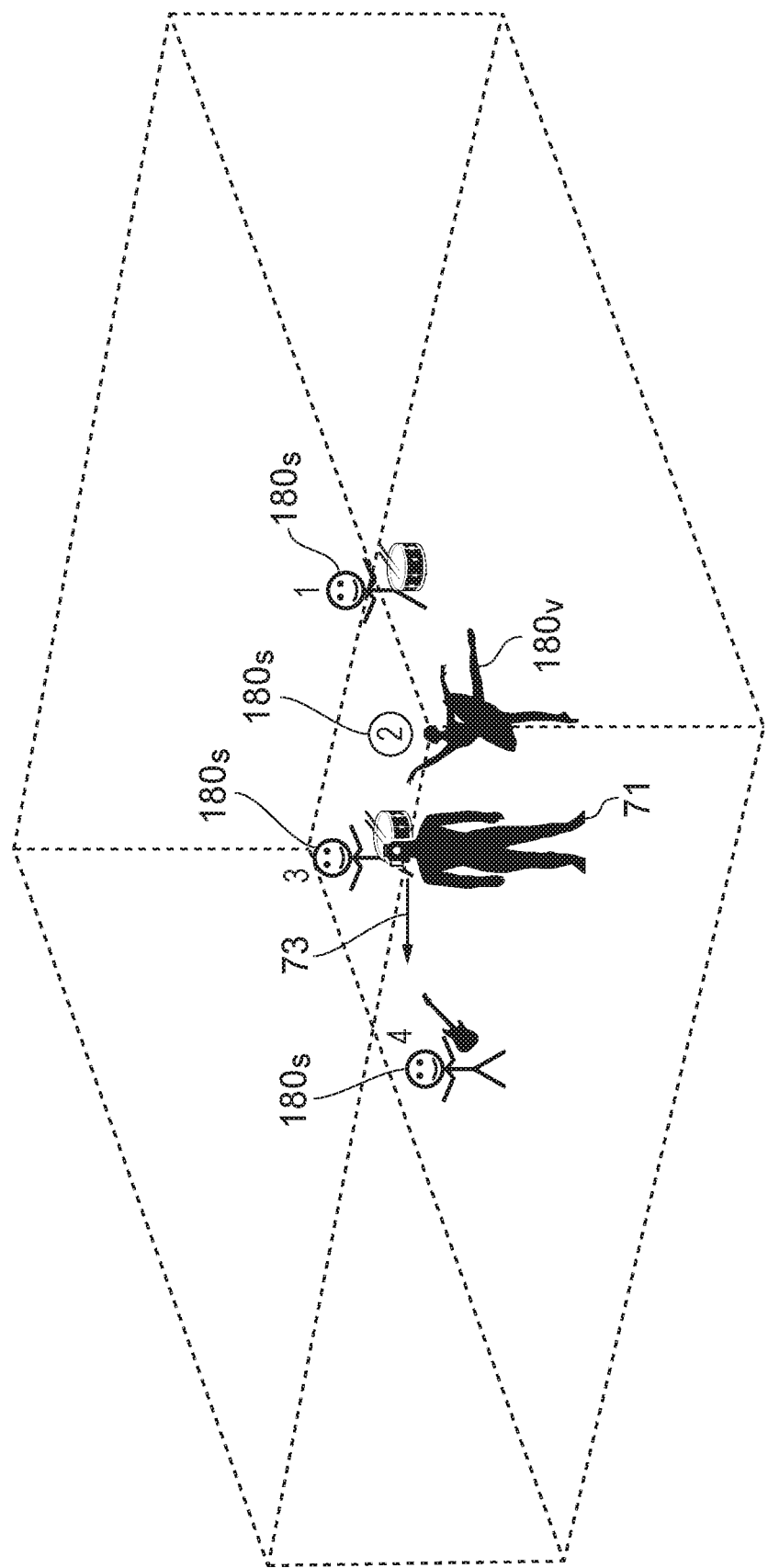
Figure 11C:
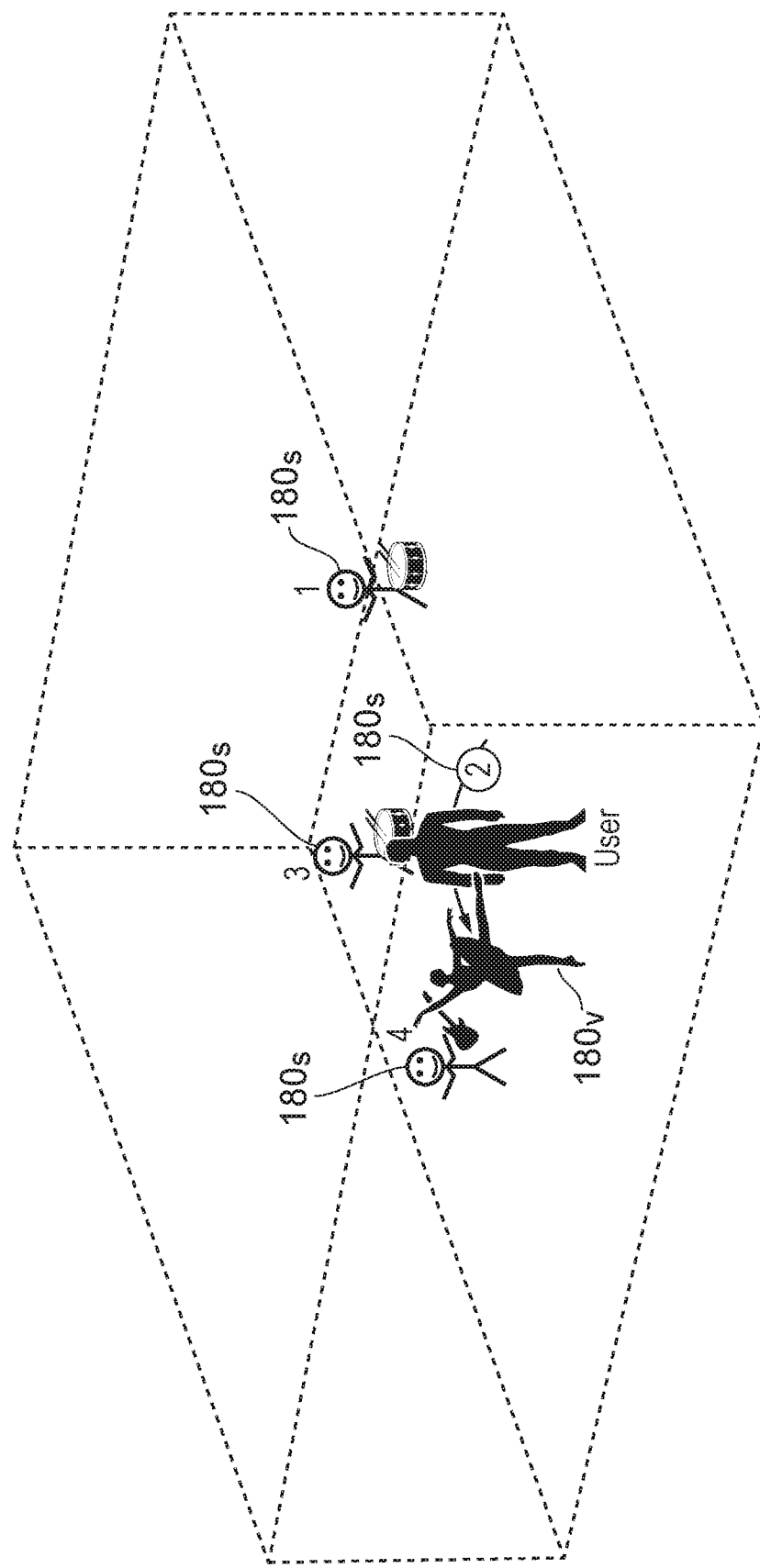

FIGS. 11A, 11B and 11C illustrate an implementation of the examples described in relation to 6DoF.

In the example of FIG. 11A, the virtual user 71 has a point of view directed towards the sound object $180_s$ indicated by a guitar. The virtual user 71 is therefore not looking towards the virtual visual object $180_v$ represented by a dancer. The available mediated reality content 100 associated with the dancer is stored as the second sub-set 104 of the available mediated reality content, in the same manner as previously described. As previously described, when the alert 190 is generated, the sound object(s) $180_s$ associated with the virtual visual object $180_v$ move towards the field of view of the virtual user or the virtual user 71 as illustrated in FIG. 11B and then the virtual visual object $180_v$ moves into the field of view of the virtual user 71 as illustrated in FIG. 11C.

In this example the second sub-set 104 of the available mediated reality content 100 stores all the dance moves of the dancer such that the user, should they wish, can review these at a later time.

It will therefore be understood from the previous examples that the alert 190 includes an escalation that becomes more noticeable with the progress of time.

FIG. 12A illustrates an example of a controller 300. Implementation of a controller 300 may be as controller circuitry. The controller 300 may be implemented in hardware alone, have certain aspects in software including firmware alone or can be a combination of hardware and software (including firmware).

As illustrated in FIG. 12A the controller 300 may be implemented using instructions that enable hardware functionality, for example, by using executable instructions of a computer program 306 in a general-purpose or special-purpose processor 302 that may be stored on a computer readable storage medium (disk, memory etc) to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 310 when loaded into the processor 302. The computer program instructions, of the computer program 306, provide the logic and routines that enables the apparatus to perform the methods illustrated in any of the preceding FIGS. The processor 302 by reading the memory 304 is able to load and execute the computer program 306.

The apparatus 310 therefore comprises:
at least one processor 302; and
at least one memory 304 including computer program code
the at least one memory 304 and the computer program code configured to, with the at least one processor 302, cause the apparatus 310 at least to perform:
throughout a first period of time, enabling user-selection of a first sub-set of available mediated reality content based on a current point of view of a user, wherein the point of view of the user can change during the first period of time causing a change in the user-selected first sub-set;
throughout the first period of time, causing rendering of the selected first sub-set of available mediated reality content to the user as it is selected;
throughout the first period of time, storing a second sub-set of the available mediated reality content for potential future rendering, wherein the second sub-set is different to the first sub-set being rendered to the user and is not being rendered to the user during the first period of time;
during at least a latter portion of the first period of time, determining whether or not to augment the user-selected first sub-set of available mediated reality content to include an alert concerning the second sub-set of available mediated reality content.

As illustrated in FIG. 12B, the computer program 306 may arrive at the apparatus 310 via any suitable delivery mechanism 308. The delivery mechanism 308 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 306. The delivery mechanism may be a signal configured to reliably transfer the computer program 306. The apparatus 310 may propagate or transmit the computer program 306 as a computer data signal.

Computer program instructions for causing an apparatus to perform at least the following or for performing at least the following:
throughout a first period of time, enabling user-selection of a first sub-set of available mediated reality content based on a current point of view of a user, wherein the point of view of the user can change during the first period of time causing a change in the user-selected first sub-set;
throughout the first period of time, causing rendering of the selected first sub-set of available mediated reality content to the user as it is selected;
throughout the first period of time, storing a second sub-set of the available mediated reality content for potential future rendering, wherein the second sub-set is different to the first sub-set being rendered to the user and is not being rendered to the user during the first period of time;
during at least a latter portion of the first period of time, determining whether or not to augment the user-selected first sub-set of available mediated reality content to include an alert concerning the second sub-set of available mediated reality content.

The computer program instructions may be comprised in a computer program, a non-transitory computer readable medium, a computer program product, a machine readable medium. In some but not necessarily all examples, the computer program instructions may be distributed over more than one computer program.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

FIG. 13 illustrates an example of a the apparatus 310 configured as a head mounted display apparatus 502.

The head mounted display apparatus 502 comprises a display 504 that may be see through or not see-through. The display 504 is configured to display mediated reality content, for example, a virtual visual scene. The head mounted display apparatus 502 can, in some examples, comprise audio output device(s) 506. The audio output device(s) 506 is/are configured to render mediated reality content, for example, a sound scene.

The head mounted display apparatus 502 is configured to enable tracking of an orientation 53 of a user 51 wearing the head mounted display apparatus 502. In this example, the head mounted display apparatus 502 comprises positioning circuitry 508 that enables tracking of a location 52 and enables tracking of a head orientation 53 of the user 51 wearing the head mounted apparatus 502.

The apparatus 502 is, for example as previously described. In some examples, it comprises means for:

means for, throughout a first period of time, enabling user-selection of a first sub-set of available mediated reality content based on a current point of view of a user, wherein the point of view of the user can change during the first period of time causing a change in the user-selected first sub-set;

means for, throughout the first period of time, causing rendering of the selected first sub-set of available mediated reality content to the user as it is selected;

means for, throughout the first period of time, storing a second sub-set of the available mediated reality content for potential future rendering, wherein the second sub-set is different to the first sub-set being rendered to the user and is not being rendered to the user during the first period of time;

means for, during at least a latter portion of the first period of time, determining whether or not to augment the user-selected first sub-set of available mediated reality content to include an alert concerning the second sub-set of available mediated reality content.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 300 may be a module, for example.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising
at least one processor; and
at least one non-transitory memory including computer program code;
the at least one memory and the computer program code configured to, with the at least one processor, cause the apparatus at least to perform:
throughout a first period of time, enabling user-selection of a first sub-set of available mediated reality content based on a current point of view of a user, wherein the point of view of the user can change during the first period of time causing a change in the user-selected first sub-set;
throughout the first period of time, causing rendering of the selected first sub-set of available mediated reality content to the user as it is selected;
throughout the first period of time, storing a second sub-set of the available mediated reality content for potential future rendering, wherein the second sub-set is different to the first sub-set being rendered to the user and is not being rendered to the user during the first period of time;
during at least a latter portion of the first period of time, determining whether or not to augment the user-selected first sub-set of available mediated reality content to include an alert concerning the second sub-set of available mediated reality content; and
enable transition from rendering a portion of the first sub-set of available mediated reality content to rendering a portion of the second sub-set of available mediated reality content, wherein the portion of the first sub-set of available mediated reality content is associated with a first time within a timeline of the available mediated reality content and wherein the portion of the second sub-set of available mediated reality content is associated with a second time within the timeline of the available mediated reality content, the first time and the second time being different, wherein the first time is later than the second time.

2. The apparatus as claimed in claim 1, wherein determining whether to augment the user-selected first sub-set of available mediated reality content to include the alert is further configured to determine whether to augment the user-selected first sub-set of available mediated reality content based upon an approaching change in memory management concerning the second sub-set of the set of available mediated reality content.

3. The apparatus as claimed in claim 1, wherein determining whether to augment the user-selected first sub-set of available mediated reality content to include the alert is further configured to augment the user-selected first sub-set of available mediated reality content based upon available room for storing the second sub-set of available mediated reality content.

4. The apparatus as claimed in claim 1, wherein determining whether to augment the user-selected first sub-set of available mediated reality content to include the alert is further configured to augment the user-selected first sub-set of available mediated reality content based upon at least one of the following:
an approaching automatic degrade of a resolution at which the second sub-set of available mediated reality content is stored;
an approaching automatic time-shifting of a beginning of the stored second subset of available mediated reality content; or
an approaching automatic stop of recording of the second sub-set of available mediated reality content.

5. The apparatus as claimed in claim 2, wherein the alert enables a user-selectable option to control memory management concerning the second sub-set of available mediated reality content.

6. The apparatus as claimed in claim 1, wherein determining whether to augment the user-selected first sub-set of available mediated reality content to include the alert is further configured to augment the user-selected first sub-set of available mediated reality content in dependence upon detection of an event associated with the second sub-set of available mediated reality content.

7. The apparatus as claimed in claim 1, wherein the determining whether to augment the user-selected first sub-set of available mediated reality content to include the alert is further configured to augment the user-selected first sub-set of available mediated reality content in dependence upon metadata for the second sub-set of available mediated reality content and/or in dependence upon analysis of the second sub-set of available mediated reality content.

8. The apparatus as claimed in claim 1, wherein the at least one memory and the computer program code configured to, with the at least one processor, cause the apparatus to enable transition from rendering the portion of the first sub-set of available mediated reality content to rendering the portion of the second sub-set of available mediated reality content is further configured to cause the apparatus to enable a jump-transition from rendering the portion of the first sub-set of available mediated reality content to rendering the portion of the second sub-set of available mediated reality content, wherein the portion of the first sub-set of available mediated reality content is associated with a first virtual point of view and wherein the portion of the second sub-set of available mediated reality content is associated with a second virtual point of view, the first virtual point of view and the second virtual point of view being different.

9. The apparatus as claimed in claim 8, wherein fields of view associated with the first virtual point of view and the second virtual point of view are non-overlapping.

10. The apparatus as claimed in claim 8, wherein the alert enables a selectable option for causing the jump-transition.

11. The apparatus as claimed in claim 1, wherein the alert comprises movement of a virtual object within the first sub-set of available mediated reality content, wherein the virtual object is at least partially defined by content comprised within the second subset of the available mediated reality content.

12. The apparatus as claimed in claim 1, further caused to select the second sub-set of the set of available mediated reality content in dependence upon user action and/or in dependence upon instructions associated with the available mediated reality content.

13. A method comprising:
throughout a first period of time, enabling user-selection of a first sub-set of available mediated reality content based on a current point of view of a user, wherein the point of view of the user can change during the first period of time causing a change in the user-selected first sub-set;
throughout the first period of time, causing rendering of the selected first sub-set of available mediated reality content to the user as it is selected;
throughout the first period of time, storing a second sub-set of the available mediated reality content for potential future rendering, wherein the second sub-set is different to the first sub-set being rendered to the user and is not being rendered to the user during the first period of time;
during at least a latter portion of the first period of time, determining whether or not to augment the user-selected first sub-set of available mediated reality content to include an alert concerning the second sub-set of available mediated reality content; and
enabling transition from rendering a portion of the first sub-set of available mediated reality content to rendering a portion of the second sub-set of available mediated reality content, wherein the portion of the first sub-set of available mediated reality content is associated with a first time within a timeline of the available mediated reality content and wherein the portion of the second sub-set of available mediated reality content is associated with a second time within the timeline of the available mediated reality content, the first time and the second time being different, wherein the first time is later than the second time.

14. The method as claimed in claim 13, wherein determining whether to augment the user-selected first sub-set of available mediated reality content to include the alert is further configured to determine whether to augment the user-selected first sub-set of available mediated reality content based upon an approaching change in memory management concerning the second sub-set of the set of available mediated reality content.

15. The method as claimed in claim 13, wherein determining whether to augment the user-selected first sub-set of available mediated reality content to include the alert is further configured to augment the user-selected first sub-set of available mediated reality content based upon available room for storing the second sub-set of available mediated reality content.

16. The method as claimed in claim 13, wherein determining whether to augment the user-selected first sub-set of available mediated reality content to include the alert is further configured to augment the user-selected first sub-set of available mediated reality content based upon at least one of the following:
an approaching automatic degrade of a resolution at which the second sub-set of available mediated reality content is stored;
an approaching automatic time-shifting of a beginning of the stored second subset of available mediated reality content; or
an approaching automatic stop of recording of the second sub-set of available mediated reality content.

17. The method as claimed in claim 14, wherein the alert enables a user-selectable option to control memory management concerning the second sub-set of available mediated reality content.

18. The method as claimed in claim 13, wherein determining whether to augment the user-selected first sub-set of available mediated reality content to include the alert is further configured to augment the user-selected first sub-set of available mediated reality content in dependence upon detection of an event associated with the second sub-set of available mediated reality content.

19. A non-transitory computer readable medium comprising program instructions stored thereon for performing at least the following:
throughout a first period of time, enabling user-selection of a first sub-set of available mediated reality content based on a current point of view of a user, wherein the point of view of the user can change during the first period of time causing a change in the user-selected first sub-set;
throughout the first period of time, causing rendering of the selected first sub-set of available mediated reality content to the user as it is selected;
throughout the first period of time, storing a second sub-set of the available mediated reality content for potential future rendering, wherein the second sub-set is different to the first sub-set being rendered to the user and is not being rendered to the user during the first period of time;
during at least a latter portion of the first period of time, determining whether or not to augment the user-selected first sub-set of available mediated reality content to include an alert concerning the second sub-set of available mediated reality content; and
enabling transition from rendering a portion of the first sub-set of available mediated reality content to rendering a portion of the second sub-set of available mediated reality content, wherein the portion of the first sub-set of available mediated reality content is associated with a first time within a timeline of the available mediated reality content and wherein the portion of the second sub-set of available mediated reality content is associated with a second time within the timeline of the available mediated reality content, the first time and the second time being different, wherein the first time is later than the second time.

* * * * *